March 18, 1952     H. R. CHILDRESS     2,589,539
AIRCRAFT ENGINE MOUNTING
Filed Nov. 26, 1948     2 SHEETS—SHEET 1
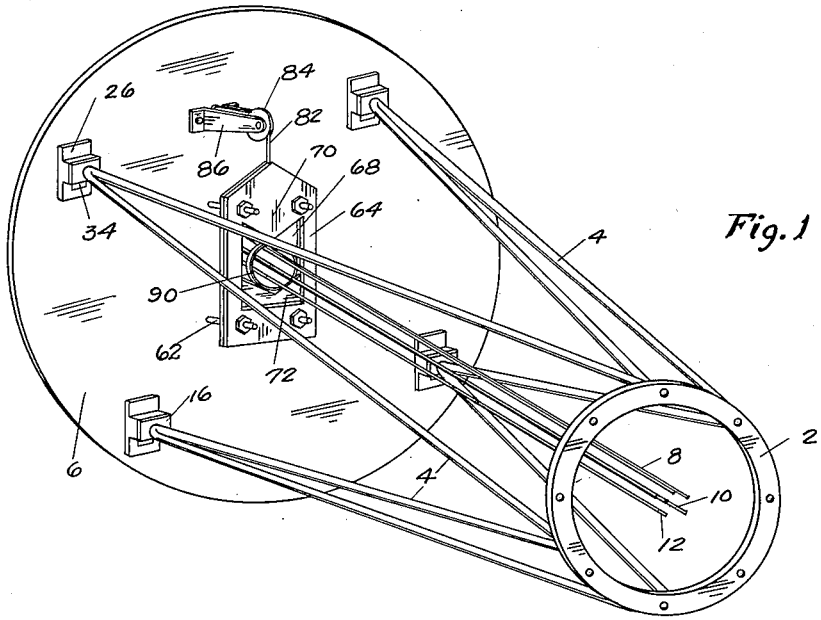
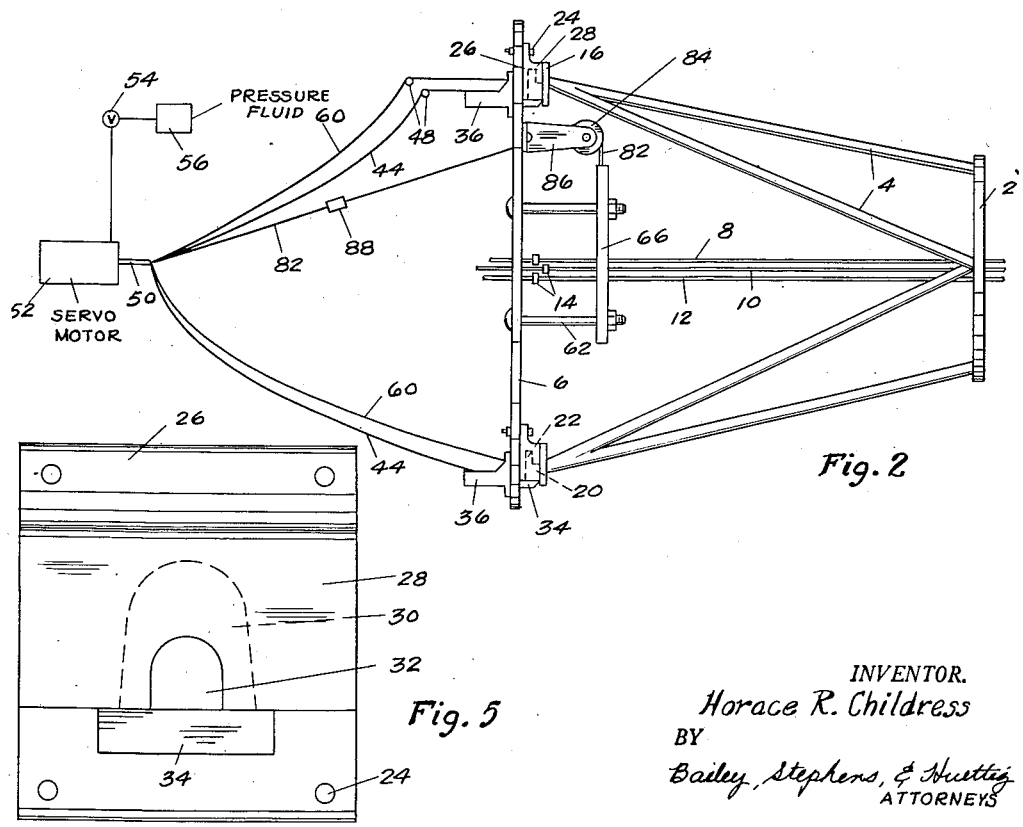
INVENTOR.
Horace R. Childress
BY
Bailey, Stephens, & Huettig
ATTORNEYS

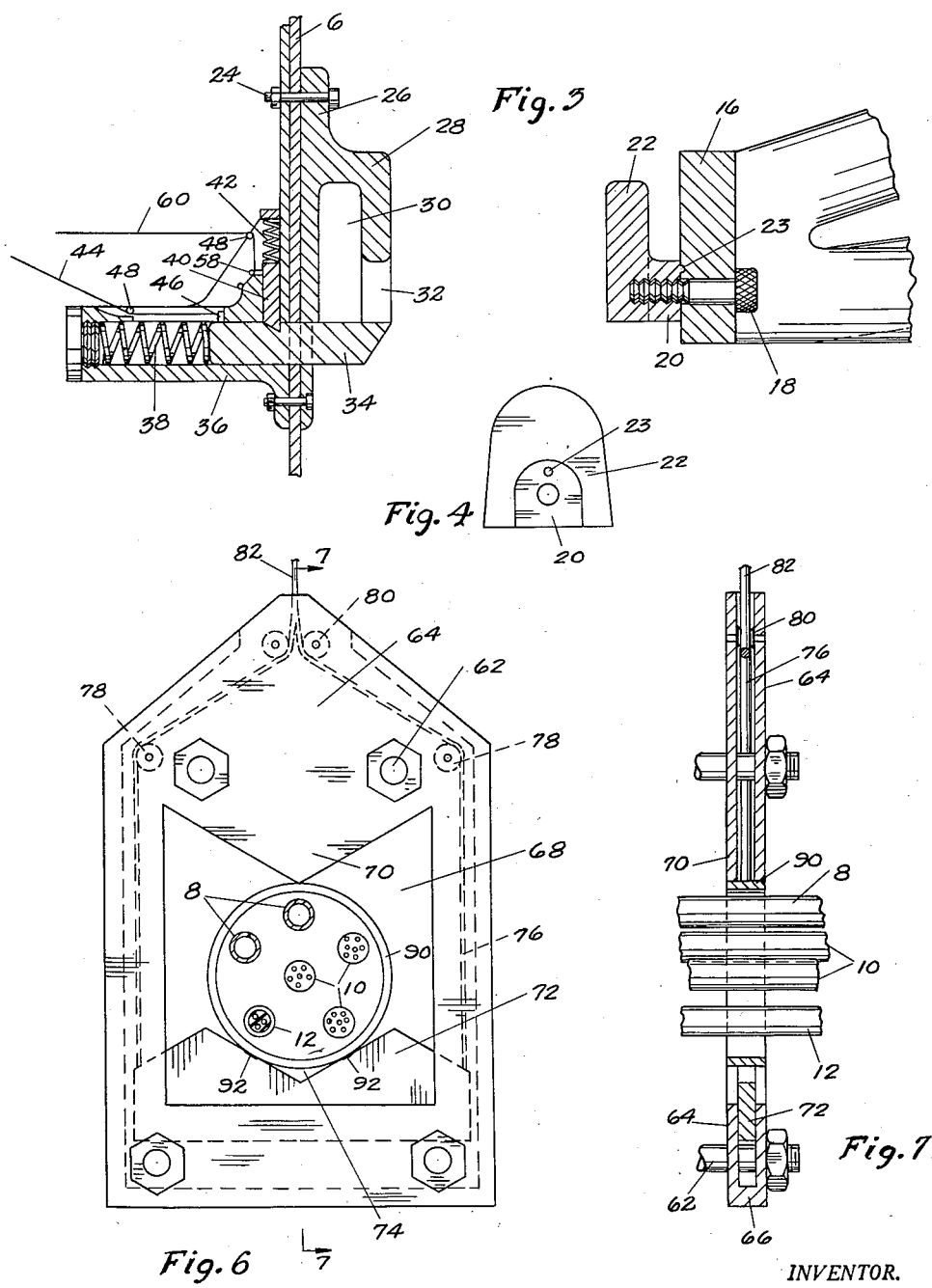

Patented Mar. 18, 1952

2,589,539

UNITED STATES PATENT OFFICE 2,589,539

AIRCRAFT ENGINE MOUNTING

Horace R. Childress, Dallas, Tex.

Application November 26, 1948, Serial No. 62,020

20 Claims. (Cl. 244—54)

The invention relates to the mounting of engines on aircraft, and more especially to releasable mountings for such engines.

When an engine for any reason breaks down while a plane is in flight, it is thereafter a useless weight which merely retards the aircraft. In military operations, this added weight may slow up the craft to a dangerous degree. Even in some civilian operations, the chances of a serious crash may often be greatly increased by the excessive load on other engines.

But when an engine catches fire for any reason, the danger is much more serious. Various safety devices have been tried for preventing the spread of such fire to the remainder of the craft, or for extinguishing the fire within the engine nacelle. Despite all these safety arrangements, however, fires continue to occur and to cause disastrous accidents.

Another difficulty which has somewhat contributed to these accidents has been the time required for changing engines, especially in commercial planes. There is a natural tendency, in trying to maintain schedules, to proceed from a stopping point with a doubtful engine, rather than to delay the flight until a different engine can be substituted.

The primary object of the present invention is to provide a simple and effective apparatus for dropping an engine from an aircraft while the aircraft is in flight.

Another object of the invention is to provide an arrangement of this sort which will also permit the quick interchange of engines when the plane is on the ground.

A further object of the invention is to provide a construction of this type in which the operating mechanism for the release of the engine is protected, as far as possible, from the influence of fire within the engine nacelle. This structure tends to prevent damage to the operating mechanism by fire, so that even if such fire occurs the releasing device will not be prevented by the heat from operating to drop the engine.

Still another object of the invention is to provide, in combination with the releasing means, a device to be operated just in advance of the releasing means for severing the service connections (oil and gas lines, electrical and control cables) from the aircraft to the engine. This ensures that the engine will not be retarded or deflected by such connections, which, if not severed, might cause the engine to fall against the propellers or other parts of the remainder of the aircraft.

An additional object of the invention is to provide a severing mechanism for service connections which protects the connections against accidental damage during normal operation of the aircraft, and which also allows ready access to the connections for the manipulation of the releasable joints or connections therein during the changing of engines or the replacement of a dropped engine.

Still a further object of the invention is the provision of a fire wall between the engine and the body of the aircraft, which serves to carry the releasable connections between the engine frame and the aircraft. The operating part of the connection moves through the fire wall, preferably in the form of a bolt slidable therethrough. The operating and latching mechanism for this bolt is located on the other side of the fire wall from the engine, and is thus protected from fire in the nacelle. The service connection severing means, however, is located on the same side of the fire wall as the engine, and spaced a limited distance from the fire wall.

Further objects and advantages of the invention will appear more fully from the following description, especially when taken in conjunction with the accompanying drawings which form a part thereof.

In the drawings:

Fig. 1 is a perspective view of an engine mounting embodying my invention;

Fig. 2 is a side elevation thereof;

Fig. 3 is a detailed cross-section through one of the releasable connections for the engine frame, showing the parts separated;

Fig. 4 is a side elevation of the engine frame element of this connection;

Fig. 5 is a similar view of the fixed element;

Fig. 6 is a front elevation of the shearing device; and

Fig. 7 is a cross-section on the line 7—7 of Fig. 6.

In the form shown herein, the invention includes an engine frame having a ring 2 and legs 4. The aircraft has a fire wall 6 for closing the rear end of the nacelle (not shown) which encloses the engine frame and the engine mounted thereon. From the engine run service connections such as fuel and lubricant pipes 8, control cables 10 and electrical wires 12. All of these pass through the fire wall near its center and are mounted in the fire wall. Just in front of the fire wall the service connections are provided with detachable joints 14.

Each pair of legs 4 carries at the end near the fire wall a plate 16. Secured on this plate by bolt 18 is one of the parts of the detachable connection forming a feature of this invention. This part has a shank 20 and an inwardly extending head 22. Shank 20 has a semi-spherical projection 23 engageable in a corresponding recess in plate 16 to ensure proper positioning of this part. Mounted on the fire wall by bolts 24 is the cooperating part of the connection. This includes a plate 26 having an outward projection 28 provided with a downwardly open socket 30 with a notch 32. Socket 30 and notch 32 correspond in shape to head 22 and stem 20.

The bottom of the socket is normally closed by a bolt 34 slidable through openings in the fire wall and in plate 26. This bolt is guided in a block 36 rigidly secured on the rear face of the fire wall, that is, on the face remote from the engine frame. A coil spring 38 in this block pushes the bolt towards its normal position (Fig. 3). The bolt is prevented from shaking or joggling out of this position by a catch 40 pressed by spring 42 into a notch in the bolt.

The bolt is controlled by a cable 44 connected to a pin 46 on the bolt and running over one or more rollers 48 to the piston rod 50 of a control cylinder 52. This cylinder can be operated by turning valve 54 to connect it to a source of pressure fluid 56. Latch 40 is also connected by pin 58 and cable 60 running over rollers 48 to piston rod 50. Cable 44 is slacker than cable 60, so that when piston rod 44 acts on these cables it will move latch 40 before it exerts a pull on bolt 34.

The service connections 8, 10, 12 pass through a severing mechanism (Figs. 6 and 7) mounted on the fire wall 6 by bolts 62 at a slight distance in front of the fire wall. The severing device includes a stationary member composed of slightly spaced front and rear plates 64 connected around their periphery, except in the top central portion, by a wall 66. These walls have aligned openings 68, the upper edges of which are defined by V-shaped downward projections 70 of the walls 64. Between these walls is slidably mounted a shearing member 72 having two spaced points separated by a V-shaped notch 74. Cables 76 are connected at their ends to opposite edges of plate 72, and run upwardly between plates 64, guided by pulleys 78, 80 to connect with a single cable 82. Cable 82 runs over a pulley 84 mounted on brackets 86 on the front of the fire wall, and then through the fire wall to connect with piston rod 50. This cable has a detachable connection 88, located at a convenient point. Cable 82 preferably has almost no slack, and in any event has less slack than cables 44, 60.

The service connections 8, 10, 12 are protected from accidental injury by the shearing mechanism. Between shear plate 72 and point 70 is arranged a ring 90 of easily frangible metal, this ring being for example lightly spot-welded to the plate 72 as at 92. This ring is large enough to allow the service connections to pass freely therethrough.

The structure hereinbefore described operates as follows:

Normally, the frame is held in position as shown in Fig. 1. If for any reason it becomes desirable to release an engine, for example if the engine is on fire, the pilot turns valve 54 and piston rod 50 is moved to the left. This first pulls cable 82, and lifts shear blade 72 (Fig. 6). This shear cuts through frangible ring 90 and through the service connections 8, 10, 12. During this action, cables 60 are pulled taut. As the piston rod moves further, it pulls up latches 40 so as to leave bolts 34 free to move, and tautens cables 44. Further movement of the piston rod now pulls bolts 34 from beneath recesses 30, so that these no longer hold the heads 22 within the recesses. The engine frame can now drop by gravity off the fire wall and away from the airplane, without interference, since the service connections have been cut before the engine is released.

Because the blocks 36, and the whole operating mechanism for bolts 34, are behind the fire wall, their proper operation will not be prevented by the heat of a fire within the nacelle.

The severing mechanism cuts the service connections at a slight distance in front of the fire wall, between the engine and the detachable joints 14. Thus when a new engine is assembled, the stubs of the old service connections can be readily removed and the new service connections properly attached.

When a quick change of engines is to be made, joint 88 is disconnected, and servo-motor 52 is operated to release bolts 34. The service connections of the removed engine are withdrawn from joints 14 through ring 90, and the new ones inserted through this ring. The ring is large enough to obviate any difficulty in this procedure.

While I have described herein one embodiment of my invention, I wish it to be understood that I do not intend to limit myself thereby except within the scope of the claims hereto or hereinafter appended.

I claim:

1. A releasable aircraft engine mounting comprising a fire wall, an engine frame, one face of said fire wall and said frame having cooperating means thereon for releasably supporting said frame on said fire wall, said supporting means including a socket part and a head part engageable in said socket part, one of said parts being mounted on the fire wall and the other on the engine frame, a member movable through said fire wall cooperating with such means for normally preventing the release thereof so as to hold said frame on said fire wall, said member comprising a bolt slidable in the fire wall and normally engaging said head so as to prevent movement thereof out of the socket, and control means for such member on the other side of said fire wall.

2. In a device as claimed in claim 1, said latching means being mounted on said fire wall and including a spring pressed latch engaging said bolt.

3. In a device as claimed in claim 1, said socket part having a downwardly open socket therein and being mounted on said fire wall and said head part being mounted on said engine frame and being engageable upwardly into said socket, and said bolt being engageable with the lower side of the head when the head is in the socket.

4. In combination with an aircraft having a body, an engine frame, and service connections from said body to said engine frame, releasable means mounting said engine frame on said body, severing means operatively associated with said service connections, a control member, and means operatively connecting said releasable means and said severing means to said control member, said connections causing said severing means to operate during the first part of the movement of the control member and thereafter releasing said releasable means.

5. In a device as claimed in claim 1, service connections to said engine frame extending through said fire wall, and means on the same side of said fire wall as said engine to sever said service connections.

6. In a device as claimed in claim 5, remotely controlled means for first operating said severing means and thereafter operating said latching and control means to release the engine frame.

7. In a device as claimed in claim 1, said socket part having a downwardly open socket therein and being mounted on said fire wall and said head part being mounted on said engine frame and being engageable upwardly into said socket, and said bolt being engageable with the lower side of the head when the head is in the socket, service connections to said engine frame extending through said fire wall, and means on the same side of said fire wall as said engine frame to sever said service connections.

8. In a device as claimed in claim 7, remotely controlled means for first operating said severing means and thereafter operating said control means to release the engine frame.

9. In a device for releasing from an aircraft an engine having service connections to the aircraft, means for severing such connections including relatively movable shearing members between which such connections extend, and an easily frangible part lying between said shear members and said connections to protect said connections against accidental damage by said shear members.

10. In a device for releasing from an aircraft an engine having service connections to the aircraft, means for severing such connections including relatively movable shearing members between which such connections extend, and an easily frangible ring loosely surrounding said connections in the plane of said shear members to protect said connections against accidental damage by said shear members.

11. In a device as claimed in claim 1, service connections to said engine frame extending through said fire wall, and means on the same side of said fire wall as said engine frame to sever said service connections, said last means being mounted on said fire wall.

12. In a device as claimed in claim 10, said severing means including relatively movable shearing members between which such connections extend, and an easily frangible part lying between said shear members and said connections to protect said connections against accidental damage by said shear members.

13. In a device as claimed in claim 1, service connections to said engine frame extending through said fire wall, and means on the same side of said fire wall as said engine frame to sever said service connections, said severing means including relatively movable shearing members between which such connections extend, and an easily frangible part lying between said shear members and said connections to protect said connections against accidental damage by said shear members.

14. In a device as claimed in claim 1, service connections to said engine frame extending through said fire wall, and means on the same side of said fire wall as said engine frame to sever said service connections, said severing means including relatively movable shearing members between which such connections extend, and an easily frangible ring loosely surrounding said connections in the plane of said shear members to protect said connections against accidental damage by said shear members.

15. In a device as claimed in claim 10, said ring being of rigid material.

16. In a device as claimed in claim 10, said ring being of metal.

17. In a device as claimed in claim 16, means connecting said ring with one of said shearing members.

18. In a device as claimed in claim 17, said ring loosely surrounding said service connections.

19. In a device as claimed in claim 10, means connecting said ring with one of said shearing members.

20. In a device as claimed in claim 10, said ring loosely surrounding said service connections.

HORACE R. CHILDRESS.

REFERENCES CITED

The following references are of record in the file of this patent:

UNITED STATES PATENTS

| Number | Name | Date |
| --- | --- | --- |
| 1,237,889 | Fernandez | Aug. 21, 1917 |
| 1,300,190 | Pogolski | Apr. 8, 1919 |
| 1,851,129 | Reardan | Mar. 29, 1932 |
| 1,879,632 | O'Brien | Sept. 27, 1932 |
| 2,001,158 | Segrs | May 14, 1935 |
| 2,010,817 | Henry | Aug. 13, 1935 |
| 2,416,104 | Lerche | Feb. 18, 1947 |
| 2,443,276 | Seevers | June 15, 1948 |